Sept. 27, 1960 F. A. SCHAUFELBERGER 2,954,272
METHOD OF SEPARATING AMMONIA FROM A GAS
CONTAINING AMMONIA AND CARBON DIOXIDE
Filed March 23, 1954
Fig. 1.
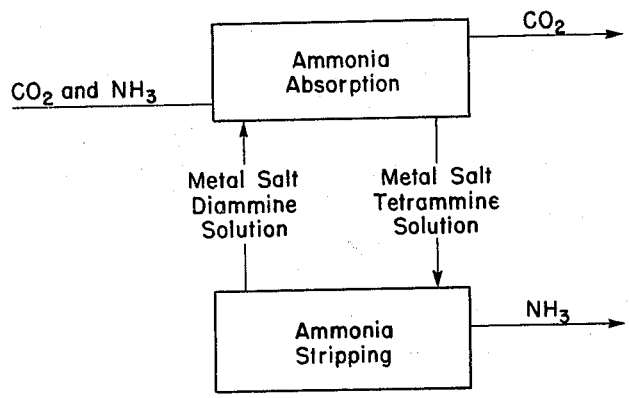
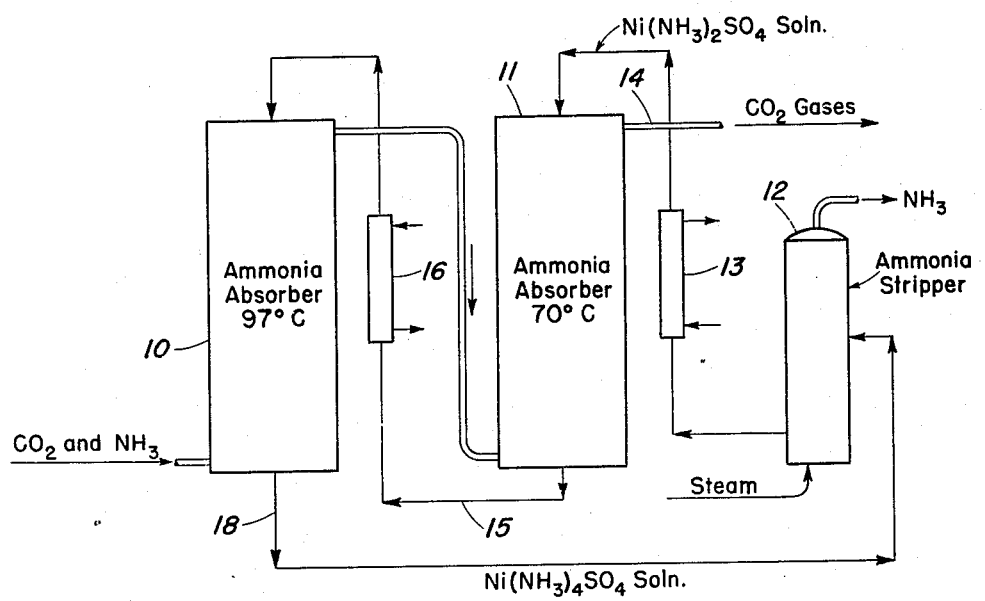
Fig. 2.
INVENTOR
Felix A. Schaufelberger
BY
Wm. P. Spielman
ATTORNEY

United States Patent Office 2,954,272
Patented Sept. 27, 1960

2,954,272

METHOD OF SEPARATING AMMONIA FROM A GAS CONTAINING AMMONIA AND CARBON DIOXIDE

Felix A. Schaufelberger, Stamford, Conn., assignor to Chemical Construction Corporation, New York, N.Y., a corporation of Delaware Filed Mar. 23, 1954, Ser. No. 417,987

5 Claims. (Cl. 23—2)

This invention relates to a process for the separation and recovery of substantially pure ammonia from ammonia-containing gases and particularly from gases which also contain carbon dioxide. A principal object of the invention is the provision of a novel class of absorbent solutions for ammonia which can be used with any ammonia-containing gases but are particularly well suited for the substantially complete separation of ammonia from carbon dioxide and other acidic gases. A further object is the provision of a process of the type indicated that can be carried out at substantially atmospheric pressures and at temperatures that are easily maintained in ordinary gas washing and solvent regenerating equipment. Still further objects will be apparent from the following description of preferred embodiments of the invention when taken with the appended claims.

The process of the invention is based on the concept of scrubbing ammonia-containing gases with an aqueous solution of a metal ammine which contains less than 4 coordinating ammonia groups and is therefore capable of combining with additional ammonia. I have found that the ammine complex salts of those metals which form stable water-soluble ammines are well suited for use in regenerative ammonia scrubbing processes when the solvent also contains an ammonium salt of a strong inorganic acid such as ammonium halides, ammonium nitrate and the like. The preferred ammonium salt is ammonium sulfate, since solutions containing this salt together with metal ammine complex salts have produced excellent results in practice.

It is well known that metal ammine complex salts stable in aqueous solutions are formed from certain metals having atomic volumes not greater than 13. These metals are nickel, cobalt, copper, zinc and cadmium; their halides, sulfates, nitrates and other water-soluble salts of strong inorganic acids form ammine complexes with up to 6 mols of ammonia. I have found that aqueous solutions containing these metal complexes together with at least an equimolecular quantity of ammonia combined as an ammonium salt of a strong inorganic acid can be used as scrubbing agents for the substantially complete removal of ammonia from gases and that they will liberate the absorbed ammonia in substantially pure condition upon heating.

Ammonia-containing gases which are free from carbon dioxide or other acidic materials can be scrubbed with metal ammine complex salt solutions at any desired temperatures and pressures, and the removal of ammonia from such gases is included within the broad scope of my invention. The separation of ammonia from carbon dioxide and other acidic gases, however, presents a troublesome industrial problem, and it is a particular advantage of the present invention that ammonia can be substantially completely separated therefrom by the use of metal ammine complex solutions by employing the operating conditions hereinafter described. The removal of ammonia from mixtures thereof with carbon dioxide, and the recovery of substantially pure ammonia gases from such mixtures therefore constitutes an important feature of the invention.

In order to separate ammonia from carbon dioxide the scrubbing step should be carried out at a temperature that is sufficiently high to prevent substantial solution of carbon dioxide in the scrubbing liquid, and ordinarily temperatures above about 50°–60° C. should be used. The maximum scrubbing temperatures should of course be lower than those at which the metal ammine salt solution begins to evolve ammonia, and should therefore not be higher than about 110°–115° C. Within these limits the optimum scrubbing temperatures will depend on the gas composition, the kind of ammine used and the completeness of ammonia removal and purity of the recovered ammonia that may be desired.

As is stated above, the scrubbing solutions used in practicing the invention are aqueous solutions of metal ammine complex salts of strong inorganic acids which also contain an ammonium salt. In the ammine complexes of this type the ammonia is contained in a loosely combined or coordinated condition, and therefore the complex may contain from about 1 to about 4 and sometimes 6 mols of ammonia for each atom of metal. I have found, however, that the vapor tension of ammonia is appreciable over aqueous solutions of metal ammine complexes containing more than about 4 mols of combined ammonia, and therefore the absorbing solutions should be regenerated when the tetrammine stage has been reached. Solutions of metal ammine complexes containing less than 2 mols of coordinated ammonia tend to become unstable on heating, and are likely to precipitate metal hydroxides or basic metal salts, particularly when no buffer salt is present, and therefore the regeneration should be carried only to the metal diammine stage in systems where precipitation is not desired. On the other hand, slurries or suspensions of basic metal salts, even ammonia-free salts, are excellent absorbing agents for ammonia, and the regeneration of ammonia enriched absorbing solutions may be carried to the point where such dispersions are formed if desired.

The invention is not limited to the use of metal ammine complex salt solutions of any particular concentration, and either relatively dilute or concentrated solutions may be used as desired. In general, however, the more concentrated aqueous salt solutions are preferred since these have a correspondingly higher absorbing power for ammonia and therefore require regeneration less frequently. Solutions containing about 50–100 grams per liter of metal are therefore recommended, although in special cases solutions containing as little as 30 grams or as much as 125 grams of metal per liter may be used.

The quantity of ammonium salt present in the absorbing solution can likewise be varied. Ammonium sulfate may form a slightly soluble double salt with the metal salt at low ammonia contents, a during regeneration of the absorption solution; in fact a metal ammonium double salt such as $NiSO_4 \cdot (NH_4)_2SO_4 \cdot 6H_2O$ can be precipitated by boiling a metal ammine sulfate solution containing more than 1 mol and preferably about 1.5–2 mols of ammonium sulfate per liter. The ammonium salt therefore assists in liberating the complex-bound ammonia during regeneration, thereby permitting a decrease in the size of the regenerating equipment. If ammonia regeneration is carried as far as double salt precipitation, the capacity of the absorbent for ammonia is considerably increased. The presence of an ammonium salt of a strong acid is also important in treating carbon dioxide-containing gases since it lowers the solubility of carbon dioxide in the absorbing solution. In general, therefore, relatively high concentrations of ammonium salt on the order of about 1–2 mols per liter are preferred in the absorbing solution.

The invention will be further described with reference to the accompanying drawing wherein Fig. 1 represents diagrammatically the absorption and stripping or regeneration steps of the process and Fig. 2 is a flow diagram showing suitable conditions when multi-stage ammonia absorption is used.

Referring to Fig. 1, the regenerated solution from the ammonia stripping step is indicated as a metal salt diammine solution. This regenerated solution is contacted intimately with gases containing carbon dioxide and ammonia in any suitable gas scrubbing equipment such as a packed tower, a Feld gas washer or the like. The ammonia content of the gas is substantially completely taken up by the scrubbing solution, and during this absorption the metal salt diammine complex is converted step-wise to the corresponding metal salt tetrammine solution. The solution should be regenerated when substantially all of the metal salt complex therein has been converted to the tetrammine stage, since there is a tendency for carbon dioxide to be absorbed in solutions of higher ammonia content with the formation of ammonium carbonate. The ammonia-enriched solution is easily regenerated when it contains a dissolved ammonium salt, simply by heating it to temperatures at which ammonia is given off from the metal salt complex. Such metal ammine complex decomposing temperatures will vary somewhat with the particular metal salt used and with the quantity of dissolved ammonium sulfate or other ammonium salt in the solution but in general are in the range of about 105° to 120° C. In other words, all of the metal ammine complex salt solutions of the present invention can be regenerated from the tetrammine stage to the diammine stage or lower by heating them at atmospheric pressure at temperatures above about 110° C. This regeneration may be carried out by indirect heating, by the injection of steam or by any other suitable means; an ammonia stripping column of the usual type is preferably employed. The ammonia is evolved in a substantially pure condition, the only other material present being water vapor from which the ammonia can easily be separated.

For most purposes it is advisable to decompose the metal ammine complex salt in the stripping step only to an extent corresponding to the formation of the diammine, since precipitates of metal hydroxides, basic metal salts or metal ammonium double salts are formed at a lower ammonia content. However, slurries or suspensions of such precipitates are excellent absorbing agents for ammonia and are reconverted into metal ammine complex solutions during the absorption step, and may therefore be used if desired. A process wherein such a slurry is employed is illustrated in Example 3.

When ammonia of very low carbon dioxide content is desired temperatures substantially above 60° C., and preferably within the range of about 90°–105° C. are required in the absorbing liquid. It will be evident, however, that the tension of ammonia over the scrubbing liquid is increased at these temperatures, and therefore the exit gases from a single scrubber would have an appreciable ammonia content. This can be avoided, while obtaining a substantially carbon dioxide-free ammonia gas, by using a plural-stage absorption system of the type shown by Fig. 2 of the drawings. In this figure a first ammonia absorber 10 is shown which may be a packed tower, a tower provided with bubble plates, or any other suitable equipment for obtaining countercurrent contact between the gas and the scrubbing liquid. A last absorber 11, preferably of the same type, operates in series with the absorber 10, and other intermediate absorbers operating at intermediate temperatures may be employed if desired. Regenerated scrubbing solution from a regenerator or ammonia stripper 12 is cooled in a cooler 13 and fed into the top of the absorber 11 at a temperature such as to maintain an equilibrium temperature at 70° C. at the gas exit 14 thereof; at this temperature the scrubbing solution has practically no ammonia vapor tension and therefore only traces of ammonia will appear in the exit gases from the system. The scrubbing liquid from the base of the tower 11 may pass in sequence through any intermediate absorber or absorbers countercurrent to the flow of gases passing therethrough and is then passed, as by a line 15 and heater 16, to the top of the first ammonia absorber 10, its temperature being such that an equilibrium temperature of about 97° C. is maintained at the base of the tower. The ammonia-enriched solution leaving this tower through line 18 is therefore substantially free from dissolved carbon dioxide, and when this solution is regenerated in the stripper 12 the ammonia evolved therefrom will be of high purity.

From the foregoing it will be seen that the present invention provides an ammonia stripping process of great practical utility and one that is particularly well adapted for the treatment of carbon dioxide and ammonia-containing gases. Gases consisting substantially of carbon dioxide and ammonia are formed in the manufacture of urea by the thermal decomposition of ammonium carbonate and also in the manufacture of melamine by heating urea at elevated temperatures and pressures in the presence of ammonia. Gas mixtures containing both carbon dioxide and ammonia in admixture with other gases are encountered in other processes, as in the recovery of scrap-copper and brass by leaching with ammonia-ammonium carbonate mixtures followed by reducing with carbon monoxide. These and other gases of similar character can be treated by the process of the present invention with the recovery of substantially pure ammonia and with substantially complete separation of all the ammonia from the gases undergoing treatment.

The invention will be further illustrated by the following specific examples. It should be understood however that although these examples may describe in detail some of the more specific features of the invention they are given primarily for purposes of illustration and the invention in its broader aspects is not limited thereto.

*Example 1*

A gas mixture saturated with water and containing nitrogen, methane, hydrogen, 8.1% by volume of ammonia and 37.3% of carbon dioxide was scrubbed in a packed tower by countercurrent contact with a regenerated aqueous nickel ammine salt solution at 80° C. and atmospheric pressure. The regenerated scrubbing solution at the inlet of the scrubber contained 82 grams per liter of nickel as nickel sulfate, coordinated ammonia at an $NH_3$:Ni mol ratio of 2.1 and 135 grams per liter of ammonium sulfate. The ammonia of the incoming gas was absorbed quantitatively, the exit gas containing less than 0.05% of ammonia. The carbon dioxide content of the absorbent was below 0.2 gram per liter.

The absorbing solution was recirculated through the absorber without regeneration until the amount of coordinated ammonia reached a mol ratio of $4NH_3$ per mol of nickel. At this point the content of ammonia in the exit gases increased to 0.2% but the carbon dioxide in the absorbing solution was not greater than 0.2 gram per liter.

The absorbing solution was then regenerated by heating it at its boinging point until sufficient ammonia evolved to restore the original ratio of coordinated ammonia to nickel of 2.1 after which the absorbing cycle was repeated.

In this process each liter of the regenerated absorbent was able to treat 735 liters of the ammonia-containing gas and released 45.2 grams of ammonia upon regeneration. The ratio of carbon dioxide to ammonia in the exit gas of the absorber was about 300 to 1 and the ratio of ammonia to carbon dioxide in the ammonia gases from the recovery system was about 220 to 1.

Example 2

A water saturated gas containing 1.8% by volume of ammonia and 2.8% of carbon dioxide together with nitrogen, hydrogen and methane was scrubbed at 85° C. and atmospheric pressure in the equipment described in Example 1 using an aqueous zinc diammine solution as the scrubbing agent. This solution contained 78 grams per liter of zinc as zinc sulfate, coordinated ammonia at an ammonia to zinc ratio of 2.2 and 125 grams per liter of ammonium sulfate. The absorption of ammonia from the incoming gas was substantially quantitative, the exit gas containing less than 0.05% of ammonia. The carbon dioxide content of the absorbent did not increase above 0.2 gram per liter. When the amount of coordinated ammonia in the absorbent reach 4 mols per mol of zinc the absorbent was drawn off and regenerated by boiling until its original ammonia content was restored. It was found that each liter of the absorbent was able to scrub 2550 liters of the ammonia-containing gas before regeneration was necessary.

Example 3

The gas of Example 1 was scrubbed at 80° C. and atmospheric pressure by countercurrent contact with a slurry consisting of a suspension of nickel ammonium sulfate double salt in an aqueous solution of nickel ammine sulfate, this slurry having the overall composition in grams per liter of 92 parts of nickel as $NiSO_4$, 212 parts of $(NH_4)_2SO_4$ and coordinated ammonia at an $NH_3:Ni$ mol ratio of 0.8. The ammonia separation was the same as that described in Example 1 but the ammonia absorbing capacity of the slurry was substantially greater. Gas measurements showed that 1391 liters of gas could be scrubbed for each liter of the scrubbing slurry and that 85.4 grams of ammonia at a carbon dioxide:ammonia ratio of 1:500 were released by each liter of the ammonia-rich absorbent upon regeneration.

This example illustrates the point that, in equipment wherein a slurry containing suspended salts can be handled, metal ammines having a ratio of coordinated ammonia to metal of substantially below 2.0 can be used to advantage. The suspended metal salts in these slurries are dissolved by the absorbed ammonia during the scrubbing process, usually at the stage where the mol ratio of coordinated ammonia to metal approaches 2.0, but are reprecipitated in the stripper when the free ammonia content falls below this range.

This is advantageous, however, insofar as the efficiency of the regeneration step is concerned, since the metal is precipitated as a double salt which results in a high vapor tension of ammonia and easy ammonia recovery. Also, the capacity of the absorbent to absorb ammonia is increased considerably.

Example 4

The gas of Example 1 was scrubbed by countercurrent contact with an aqueous nickel ammine solution in the multiple tower system illustrated in Fig. 2 of the drawings. The first tower was irrigated with an ammonia-rich solution analyzing, at the gas exit of the tower, 82 grams per liter of nickel as $NiSO_4$, coordinated ammonia at an ammonia:nickel ratio of 4.0 and 135 grams of ammonium sulfate per liter. The scrubbing was carried out at 97° C. and atmospheric pressure. The carbon dioxide content of the absorbing solution at this point was less than 0.1 gram per liter.

The scrubbing solution from the base of the first absorber was passed to the ammonia stripper and regenerated by boiling. During this regeneration it released 45.2 grams of ammonia for each liter of solution with a carbon dioxide:ammonia ratio of 1:600.

The freshly regenerated solution was cooled to the extent necessary to maintain a temperature of 70° C. in the second absorber and passed into the top of the second ammonia scrubbing stage. The solution entering this stage contained 82 grams per liter of nickel as $NiSO_4$, coordinated ammonia at an ammonia:nickel ratio of 2.1 and 135 grams per liter of ammonium sulfate. The exit gas contained only 0.015% of ammonia, corresponding to a carbon dioxide to ammonia ratio of about 2500:1.

Example 5

A gas mixture having the composition described in Example 2 was scrubbed under the operating conditions described in that example with an aqueous solution containing 134 grams per liter of cadmium as cadmium sulfate, 125 grams per liter of ammonium sulfate and coordinated ammonia as an ammonia:cadmium mol ratio of 2.2. The exit gas analyzed less than 0.05% of ammonia which increased to about 0.2% when the ammonia-to-cadmium ratio approached 4.0. The carbon dioxide content of the absorbing solution was never greater than 0.02%. When the coordinated ammonia content of the absorbent reached 4 mols per mol of cadmium the solution was drawn off and regenerated to its original ammonia content by boiling. The ammonia-absorbing capacity of this solution was equal to that of the zinc diammine sulfate solution of Example 2.

Example 6

The gas mixture of Example 1 was scrubbed under the conditions described using as the scrubbing liquid a water solution containing 90 grams per liter of copper as $CuSO_4$, 135 grams per liter of $(NH_4)_2SO_4$ and a copper:ammonia ratio of 1 to 2. The exit gas analyzed less than 0.05% of ammonia which increased later to 0.1% but not greater. The ratio of carbon dioxide to ammonia in the exit gas from the scrubber was about 500:1.

The scrubbing solution was regenerated by boiling after two mols of ammonia had been absorbed for each mol of copper. The ratio of carbon dioxide to ammonia in the gas evolved was found to be 1:220.

Example 7

The gas of Example 2 was scrubbed with an aqueous cobalt ammine sulfate solution using the operating conditions described in that example. The solution contained 70 grams per liter of cobalt as $CoSO_4$, 140 grams per liter of ammonium sulfate and coordinated ammonia at an $NH_3:Co$ ratio of 2.3. The gas scrubbed with fresh solution analyzed 0.1% of ammonia; this increased to 0.5% when the ratio of coordinated ammonia to cobalt in the solution reached 4:1. The solution was then drawn off and regenerated to its original ammonia content by boiling.

What I claim is:

1. A method of separating ammonia from carbon dioxide which comprises scrubbing a gas containing ammonia and carbon dioxide with an aqueous dispersion of an ammine salt complex of a metal selected from the group nickel, cobalt, copper, zinc and cadmium containing not more than 4 coordinating ammonia groups and having at least an equimolecular quantity of ammonia combined as an ammonium salt of a strong inorganic acid dissolved therein, the scrubbing being carried out at a temperature in the range of about 50° to 115° C., and thereby selectively absorbing the ammonia from said gas into said dispersion, regenerating the resulting ammonia-enriched dispersion by heating it and thereby recovering ammonia gas from the ammine salt complex, and returning the regenerated aqueous dispersion to the scrubbing step.

2. A method of separating ammonia from carbon dioxide which comprises scrubbing a gas containing ammonia and carbon dioxide with an aqueous solution of an ammine salt complex of a metal selected from the group nickel, cobalt, copper, zinc and cadmium containing at least 2 but not more than 4 coordinating ammonia groups and having at least an equimolecular quantity of ammonia combined as an ammonium salt of a strong inorganic acid dissolved therein, the scrubbing being carried out at a temperature in the range of about 50° to 115° C., and thereby selectively absorbing the ammonia from said gas into said dispersion regenerating the resulting ammonia-enriched solution by heating it until the ammonia content of the ammine salt complex is reduced to the diammine stage, and returning the regenerated solution to the scrubbing step.

3. A method of separating ammonia from carbon dioxide which comprises scrubbing gas containing ammonia and carbon dioxide in a first ammonia absorption stage with an aqueous solution of an ammine complex of a sulfate of a metal selected from the group nickel, cobalt, copper, zinc and cadmium containing at least 2 but not more than 4 coordinating ammonia groups and also containing at least one molecular equivalent of ammonium sulfate for each atom of metal dissolved therein and at a temperature in the range of 90–105° C. at which carbon dioxide is not dissolved in said solution, regenerating the resulting ammonia-enriched solution by heating it at the decomposition temperature of the ammine complex dissolved therein until said ammine contains approximately 2 coordinating ammonia groups and thereby producing a carbon dioxide-free ammonia gas, scrubbing the gases from the first ammonia absorption stage with the freshly regenerated diammine solution in a last ammonia absorption stage at a temperature below that of said first stage but above 50° C., and passing the ammine solution from said last stage to said first stage.

4. A method of separating ammonia from carbon dioxide which comprises scrubbing a gas containing ammonia and carbon dioxide with an aqueous dispersion of an ammine complex of a sulphate of a metal selected from the group nickel, cobalt, copper, zinc and cadmium containing not more than 4 coordinating ammonia groups and having at least an equimolecular quantity of ammonia combined as ammonium sulphate dissolved therein, scrubbing being carried out at a temperature in the range of about 50° to 115° C., and thereby selectively absorbing the ammonia from said gas into said dispersion, regenerating the resulting ammonia-enriched dispersion by heating it at a correspondingly higher temperature than the scrubbing temperature at which the ammonia is given off, said regenerating temperature being within the range of 105° C. to 120° C. and thereby recovering ammonia gas from the ammine salt complex, and returning the regenerated aqueous dispersion to the scrubbing step.

5. A method of separating ammonia from carbon dioxide which comprises scrubbing a gas containing ammonia and carbon dioxide with an aqueous solution of an ammine complex of a sulphate of a metal selected from the group nickel, cobalt, copper, zinc and cadmium containing at least two but not more than 4 coordinating ammonia groups and also containing at least one mole of ammonium sulphate for each atom of metal dissolved therein, scrubbing being carried out at a temperature in the range of about 50° to 115° C., thereby selectively absorbing the ammonia from said gas into said solution, regenerating the resulting ammonia-enriched solution by heating it at a correspondingly higher temperature than the scrubbing temperature at which the ammonia is given off, said regenerating temperature being within the range of about 105° C. to 120° C., until the ammonia content of the ammine sulphate complex is reduced to the diammine stage, and returning the regenerated solution to the scrubbing step.

References Cited in the file of this patent

UNITED STATES PATENTS

| | | |
|---|---|---|
| 837,045 | Feld | Nov. 27, 1906 |
| 1,108,705 | Cobb | Aug. 25, 1914 |
| 1,366,303 | Vis | Jan. 18, 1921 |
| 1,631,720 | Davis | June 7, 1927 |
| 1,834,814 | Wetherill | Dec. 1, 1931 |
| 2,106,734 | Golmar | Feb. 1, 1938 |

FOREIGN PATENTS

| | | |
|---|---|---|
| 121,754 | Great Britain | Jan. 22, 1918 |
| 134,572 | Great Britain | Nov. 3, 1919 |

OTHER REFERENCES

Mellor: "Comprehensive Treatise on Inorganic and Theoretical Chemistry," vol. 4, pages 342, 343, 306, Longmans, Green and Co., 1923, N.Y.